United States Patent
Striegl et al.

(10) Patent No.: US 12,132,415 B2
(45) Date of Patent: Oct. 29, 2024

(54) INVERTER CAPABLE OF SWITCHING BETWEEN SINGLE- PHASE OPERATION AND THREE-PHASE OPERATION

(71) Applicant: Fronius International GmbH, Pettenbach (AT)

(72) Inventors: Dietmar Striegl, Wels-Thalheim (AT); Martin Mörtenhuber, Wels-Thalheim (AT); Roland Lecher, Wels-Thalheim (AT); Stefan Wieser, Wels-Thalheim (AT)

(73) Assignee: Fronius International GmbH, Pettenbach (AT)

( * ) Notice: Subject to any disclaimer, the term of this patent is extended or adjusted under 35 U.S.C. 154(b) by 164 days.

(21) Appl. No.: 17/914,446

(22) PCT Filed: Mar. 26, 2021

(86) PCT No.: PCT/EP2021/057987
§ 371 (c)(1),
(2) Date: Sep. 26, 2022

(87) PCT Pub. No.: WO2021/191434
PCT Pub. Date: Sep. 30, 2021

(65) Prior Publication Data
US 2023/0120415 A1    Apr. 20, 2023

(30) Foreign Application Priority Data

Mar. 27, 2020    (EP) .................................... 20166233

(51) Int. Cl.
*H02M 7/487*    (2007.01)
*H02M 1/00*     (2006.01)
*H02M 7/537*    (2006.01)

(52) U.S. Cl.
CPC ......... *H02M 7/487* (2013.01); *H02M 1/0043* (2021.05); *H02M 7/537* (2013.01)

(58) Field of Classification Search
CPC ............ H02M 7/42; H02M 7/44; H02M 7/53; H02M 7/537; H02M 7/5387; H02M 1/0043; H20M 7/487
See application file for complete search history.

(56) References Cited

U.S. PATENT DOCUMENTS

| | | | |
|---|---|---|---|
| 3,573,600 A | * | 4/1971 | Carlisle .................. H02M 7/48 363/71 |
| 9,369,062 B2 | | 6/2016 | Wachenfeld et al. |

(Continued)

FOREIGN PATENT DOCUMENTS

| | | |
|---|---|---|
| DE | 10 2014 104 216 | 6/2015 |
| EP | 3 252 937 | 12/2017 |

(Continued)

OTHER PUBLICATIONS

Europe Search Report/Office Action conducted in counterpart Europe Appln. No. 20166233.5 (Oct. 16, 2020).

(Continued)

*Primary Examiner* — Gary L Laxton
(74) *Attorney, Agent, or Firm* — GREENBLUM & BERNSTEIN, P.L.C.

(57) ABSTRACT

In order to achieve improved single-phase operation of an inverter having a first input pole and a second input pole and including at least three phase branches, each having at least one upper power switch and at least one lower power switch connected in series to the at least one upper power switch via an output pole, a switching unit is provided. The switching unit is designed to switch the inverter from multi-phase operation to single-phase operation by closing a center point connection switch in order to connect the third output pole to the DC link center point. The switching unit is further (Continued)

Figure 1:
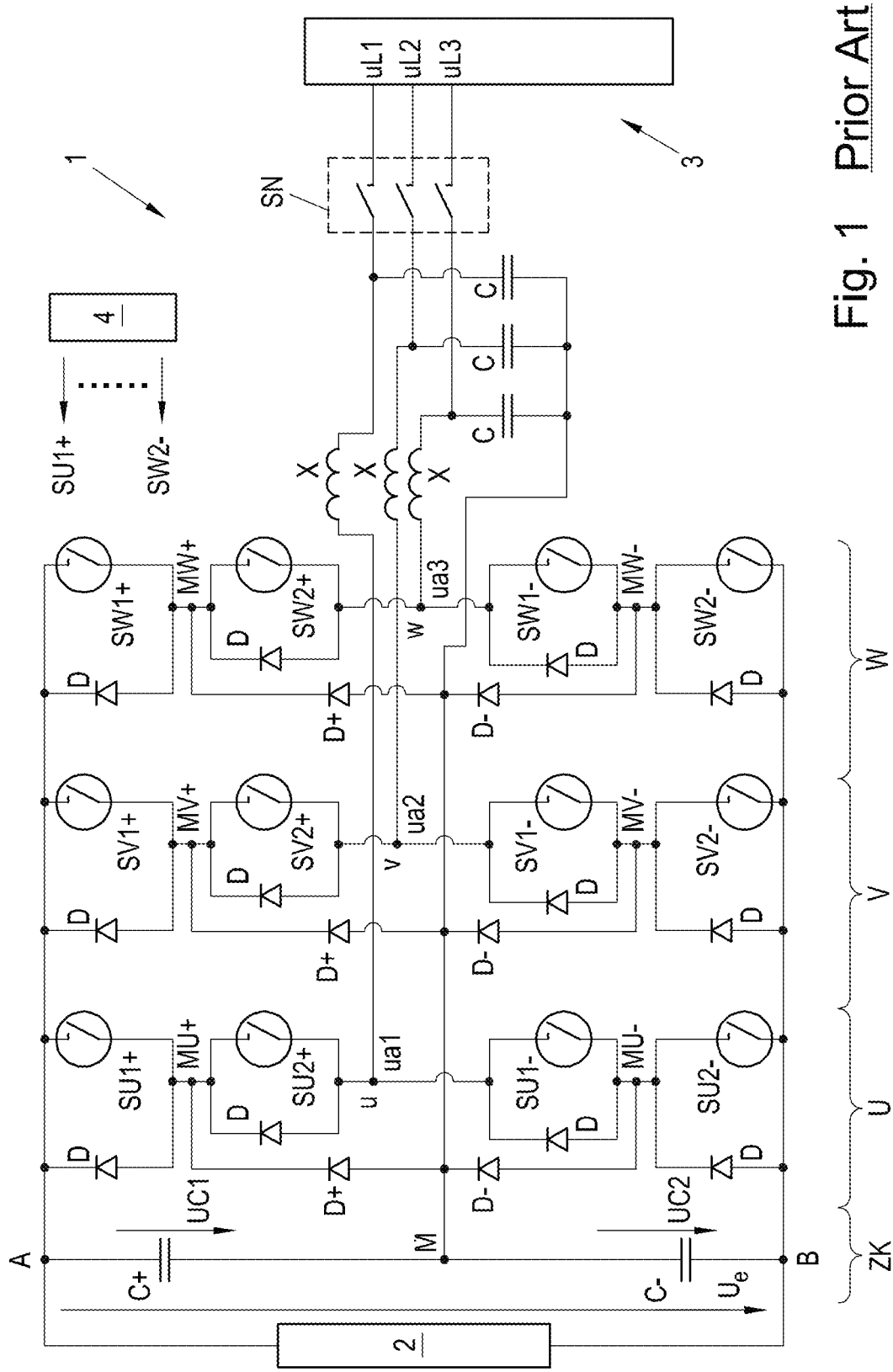

designed, in single-phase operation, to effect a control of the upper and lower power switch of the third phase branch for symmetrizing the DC link voltages at the first and second DC link capacitors.

13 Claims, 8 Drawing Sheets

(56) References Cited

U.S. PATENT DOCUMENTS

| | | | |
|---|---|---|---|
| 10,461,664 B1 | 10/2019 | Luger et al. | |
| 2012/0293004 A1* | 11/2012 | Hashimoto | H02P 9/02 |
| | | | 307/82 |

FOREIGN PATENT DOCUMENTS

| | | |
|---|---|---|
| EP | 3 562 016 | 10/2019 |
| WO | 2019/206910 | 10/2019 |

OTHER PUBLICATIONS

Int'l Search Report (Form PCT/ISA/210) conducted in Int'l Appln. No. PCT/EP2021/057987 (Jul. 9, 2021).
Int'l Written Opinion (Form PCT/ISA/237) conducted in Int'l Appln. No. PCT/EP2021/057987 (Jul. 9, 2021).
Int'l Prelim. Exam. Report (Form PCT/IPEA/409) conducted in Int'l Appln. No. PCT/EP2021/057987 (Oct. 6, 2022).

* cited by examiner

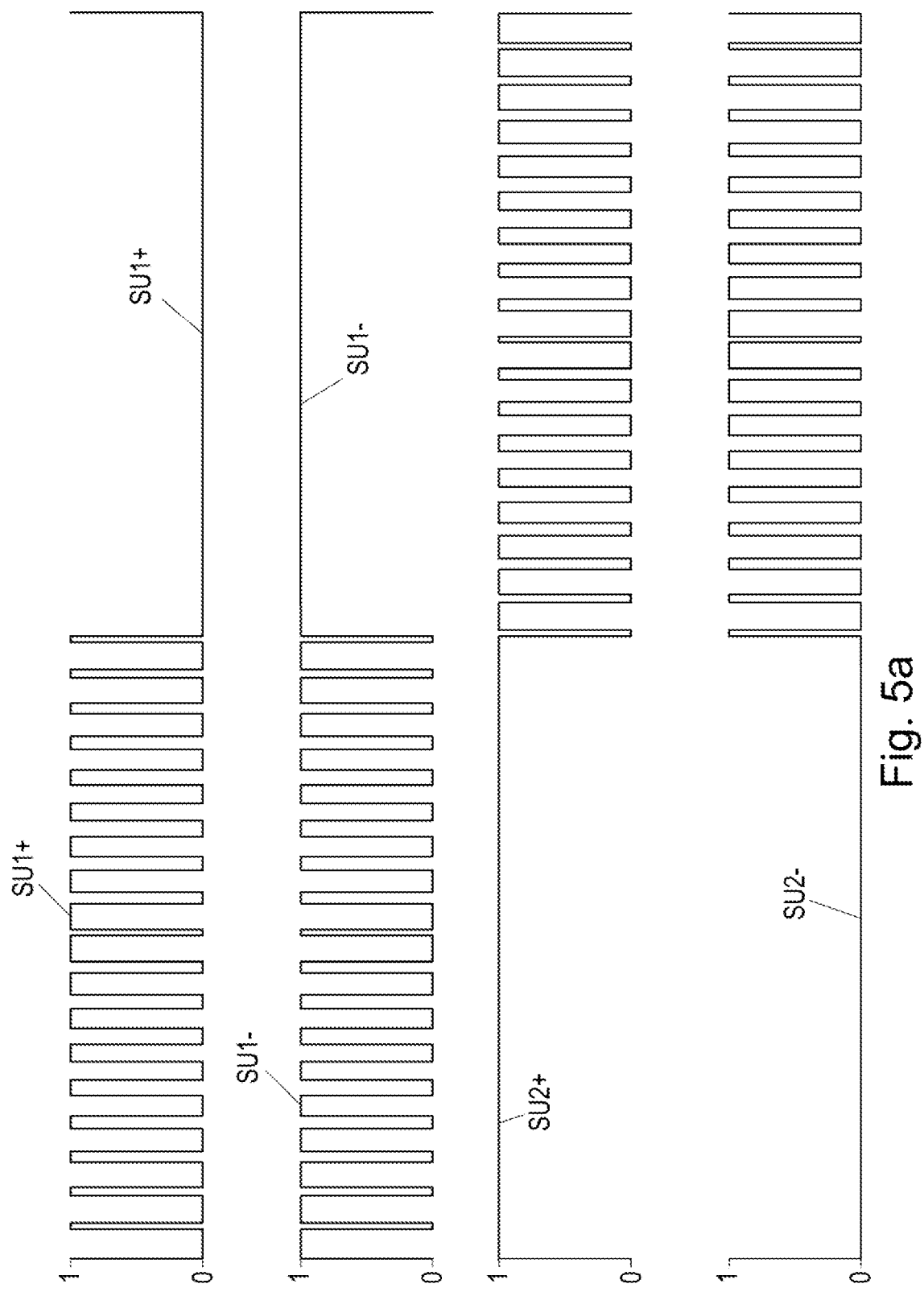

INVERTER CAPABLE OF SWITCHING BETWEEN SINGLE- PHASE OPERATION AND THREE-PHASE OPERATION

The present invention relates to an inverter having a first input pole and a second input pole and comprising a first phase branch, having an upper power switch and a lower power switch connected in series to the upper power switch via a first output pole, comprising a second phase branch, having an upper power switch and a second lower power switch connected in series to the upper power switch via a second output pole, and comprising a switching unit which is designed to switch the inverter from multi-phase operation to single phase operation in order to output a single-phase output AC voltage. The present invention further relates to a method for operating an inverter.

An inverter represents a DC/AC converter and thus converts an input DC voltage at an input side into one or more output AC voltages on an output side. The input of the inverter is connected to a DC voltage source, e.g., a photovoltaic system in generator mode, which provides the input DC voltage. An inverter can comprise one or more phase branches, wherein one output AC voltage is generated per phase branch. The output side of the inverter can be connected to an energy supply network in order to feed energy into the energy supply network. For this purpose, for example, three output poles of three phase branches of a three-phase inverter can be connected to the three network phases of an energy supply network. Furthermore, the input side of the inverter is provided with a capacitive DC link circuit. The input DC voltage is applied to the DC link circuit. If the DC link circuit comprises a first DC link capacitor, which is connected via a DC link center point to a second DC link capacitor, the input DC voltage is divided into a first DC link voltage at the first DC link capacitor and a second DC link voltage at the second DC link capacitor.

At least one first upper power switch and at least one first lower power switch are provided per phase branch, wherein the output pole of the phase branch in question is provided in each case at a connection point between the upper power switch and the associated lower power switch. In multi-phase operation, the at least one first upper power switch serves in each phase branch to generate the upper half-waves of the output AC voltage, and the at least one first lower power switch serves to generate the lower half-waves of the output AC voltage of the phase branch in question, wherein the power switches are controlled accordingly by a control unit. The power switches can be embodied, for example, as IGBTs or MOSFETs.

If the inverter is formed as a multi-level inverter, at least one second upper power switch can be provided per phase branch and is connected via an upper center point to the first upper power switch. Furthermore, at least one second lower power switch can be provided per phase branch and can be connected to the second upper power switch via a lower center point. In a multi-phase NPC (Neutral-Point-Clamped) multi-level inverter, per phase branch, the first upper power switch and second upper power switch connected via a corresponding upper center point in each case form an upper half-bridge, and the first lower power switch and second lower power switch connected via a corresponding lower center point each form a lower half-bridge. In each phase branch, the upper half bridge is connected to the lower half bridge via the associated output pole. Furthermore, the upper center point and the lower center point can each be connected via a diode to the DC link center point.

It is also possible to operate a multi-phase inverter (i.e., an inverter with several phase branches) in single-phase operation. Single-phase operation can take place, for example, as an island operation, i.e., when the output poles of the inverter are disconnected from the energy supply network. In order to implement single-phase operation, it is possible, for example, to operate only two of the three phase branches, wherein the single-phase output AC voltage is output between two of the three output poles, as disclosed in DE 10 2014 104 216 B3. The single-phase output AC voltage thus results from the potential difference of the potentials of two output poles. The first phase branch and the second phase branch together generate the output AC voltage, wherein an upper half-wave of both phase branches as well as a lower half-wave of both phase branches are generated. The third phase branch is not incorporated into single-phase operation.

It is an object of the present invention to specify an inverter which enables improved single-phase operation.

This object is achieved according to the invention in that the inverter comprises a third phase branch, having an upper power switch and a lower power switch connected in series to the upper power switch via a third output pole, and further comprises a control unit which is designed, in multi-phase operation, to control the upper power switch and the lower power switch of each of the phase branches in such a way that an input DC voltage applied between the first input pole and the second input pole is converted into an output AC voltage applied to the corresponding output pole, wherein a center point connection switch is provided between the third output pole and the DC link center point, wherein the switching unit is designed, in single-phase operation, to close the center point connection switch, in order to connect the third output pole to the DC link center point, and wherein the switching unit is designed, in single-phase operation, to effect a control of the upper and lower power switch of the third phase branch for symmetrizing the DC link voltages at the first and second DC link capacitors.

The object is further achieved by a method for operating an inverter, wherein the inverter comprises a first phase branch, having an upper power switch and a lower power switch connected in series thereto via a first output pole, a second phase branch, having an upper power switch and a lower power switch connected in series thereto via a second output pole, a third phase branch, having an upper power switch and a lower power switch connected in series thereto via a third output pole, wherein, in multi-phase operation, the upper power switch and the lower power switch of each of the phase branches are each controlled in such a way that an input DC voltage is converted into output AC voltages applied to an output pole, wherein the input DC voltage is applied to a DC link having the first DC link capacitor and a second DC link capacitor connected via a DC link center point, wherein the inverter is switched by a switching unit from multi-phase operation to single-phase operation in order to output a single-phase output AC voltage, wherein the third output pole is connected to the DC link center point, and the upper and lower power switches of the third phase branch are controlled for symmetrizing DC link voltages at the first and second DC link capacitors.

Of course, the list of first, second, and third phase branches is not to be considered exclusive, but, rather, the inverter according to the invention comprises at least three phase branches.

In an inverter with a split DC link circuit, it is provided that the DC link voltages of the DC link capacitors of the DC link circuit be equal. However, the situation may arise that the DC link voltages at the DC link capacitors diverge—for example, when a half-wave asymmetrical load occurs at an output pole. An asymmetry of the DC link voltages means a reduction of one of the DC link voltages and an increase of the other DC link voltage, whereby overloading of the DC link capacitor associated with the increased DC link voltage may occur. This may result in damage to the associated DC link capacitor. If a suitable protective mechanism is provided, an emergency shutdown can also be implemented before damage occurs. A further effect of asymmetrically-loaded DC link capacitors is constituted by distorted sinusoidal waves of the output AC voltages output at the output pole. In order to prevent the mentioned and further disadvantages, the DC link voltages are symmetrized, according to the invention. This is achieved, in single-phase operation, i.e., when only one output AC voltage is output (for which only the first and/or the second output pole are used; see below), by not using the third output pole for outputting an output AC voltage, but by connecting it to the DC link center point. The power switches of the third phase branch are then controlled for symmetrizing DC link voltages at the first and second DC link capacitors. This is particularly advantageous in the case of inverters having small overall sizes, since no additional symmetrizing unit is required for symmetrizing the DC link voltages.

The switching unit can be designed, in single-phase operation, to itself take over the control of the upper and lower power switches of the third phase branch for symmetrizing the DC link voltages at the first and second DC link capacitors. This means that it effects this control independently.

However, the switching unit can also be designed to instruct, in single-phase operation, the control unit to control the upper and lower power switches of the third phase branch for symmetrizing the DC link voltages at the first and second DC link capacitors. The control unit thus takes over the clocking of the power switches of the third phase branch for symmetrizing the DC link voltages. The switching unit thus effects the control by instructing the control unit.

The power switches of the first and/or second phase branch are controlled, in single-phase operation, for outputting the single-phase output AC voltage. This can also be implemented by the switching unit itself, or by the switching unit instructing the control unit to this end.

The switching unit can be designed, when switching from single-phase operation to multi-phase operation, to effect a control of the upper and lower power switches of the phase branches for outputting the output AC voltage at the corresponding output pole. Thus, not only a switchover from multi-phase operation to single-phase operation, but also from single-phase operation to multi-phase operation, can be carried out entirely by the switching unit.

Preferably, the switching unit is designed, in single-phase operation, to close a phase connection switch arranged between the first and second output poles in order to connect the first and second output poles to form a common output pole and to effect a control of the upper power switch and lower power switch of each of the first and second phase branches to output a single-phase output AC voltage between the common output pole and the DC link center point. In single-phase operation, the inverter can thus output twice the power to the energy supply network at one output pole, compared to operating only one phase branch in single-phase operation.

The single-phase output AC voltage thus results from the potential difference between the common output pole and the DC link center point. By interconnecting two (or more) phase branches, the current load capacity, i.e., the maximum alternating current that can be output at the common output pole, can be doubled (or multiplied) in single-phase operation, compared to normal multi-phase operation.

If a common output pole is provided in single-phase operation, then the switching unit can be designed, in single-phase operation, to instruct the control unit to control the upper power switch and lower power switch of each of the first and second phase branches for outputting a single-phase output AC voltage at the common output pole. The control unit is thus transferred into single-phase actuation mode by the switching unit.

If, in single-phase operation, a common output pole is provided, the inverter can be switched from single-phase operation to multi-phase operation, preferably by the switching unit, by disconnecting the first output pole and the second output pole.

The switching unit can be designed to open the phase connection switch during switching from single-phase operation to multi-phase operation, in order to disconnect the first output pole and the second output pole. Thus, the switching unit can also be used to switch from single-phase operation to multi-phase operation.

A second upper power switch can be connected in each of the phase branches via an upper center point to a first upper power switch, and a second lower power switch can be connected in each case via a lower center point to a first lower power switch, wherein, in each of the phase branches, the upper center point and the lower center point are connected to the DC link center point. The inverter thus corresponds to an NPC multi-level converter.

An inverter with a first input pole and a second input pole can also be provided, comprising at least three phase branches, each having at least one upper power switch and at least one lower power switch connected in series to the at least one upper power switch via an output pole, comprising a DC link arranged between the first input pole and the second input pole, having a first DC link capacitor and a second DC link capacitor connected via a DC link center point to the first DC link capacitor, and comprising a control unit which is designed, in multi-phase operation, to control the at least one upper power switch and at least one lower power switch of each of the at least three phase branches in such a way that an input DC voltage applied between the first input pole and the second input pole is converted into an output AC voltage applied to the corresponding output pole, wherein a switching unit is provided which is designed to close a phase connection switch arranged between the first and second output poles in order to connect the first and second output poles to form a common output pole and to switch the inverter from multi-phase operation to single-phase operation, and wherein the switching unit is designed, in single-phase operation, to effect a control of the power switches of each of the first and second phase branches for outputting a single-phase output AC voltage between the common output pole and the DC link center point, wherein a symmetrizing unit can be provided, in order to symmetrize DC link voltages at the first and second DC link capacitors, or wherein a center point connection switch is provided between the third output pole and the DC link center point, wherein the switching unit is designed, in single-phase operation, to close the center point connection switch in order to connect the third output pole to the DC link center point, wherein the switching unit is preferably designed, in single-phase operation, to effect a control of the power switch for symmetrizing the DC link voltages at the first and second DC capacitors.

Figure 2:
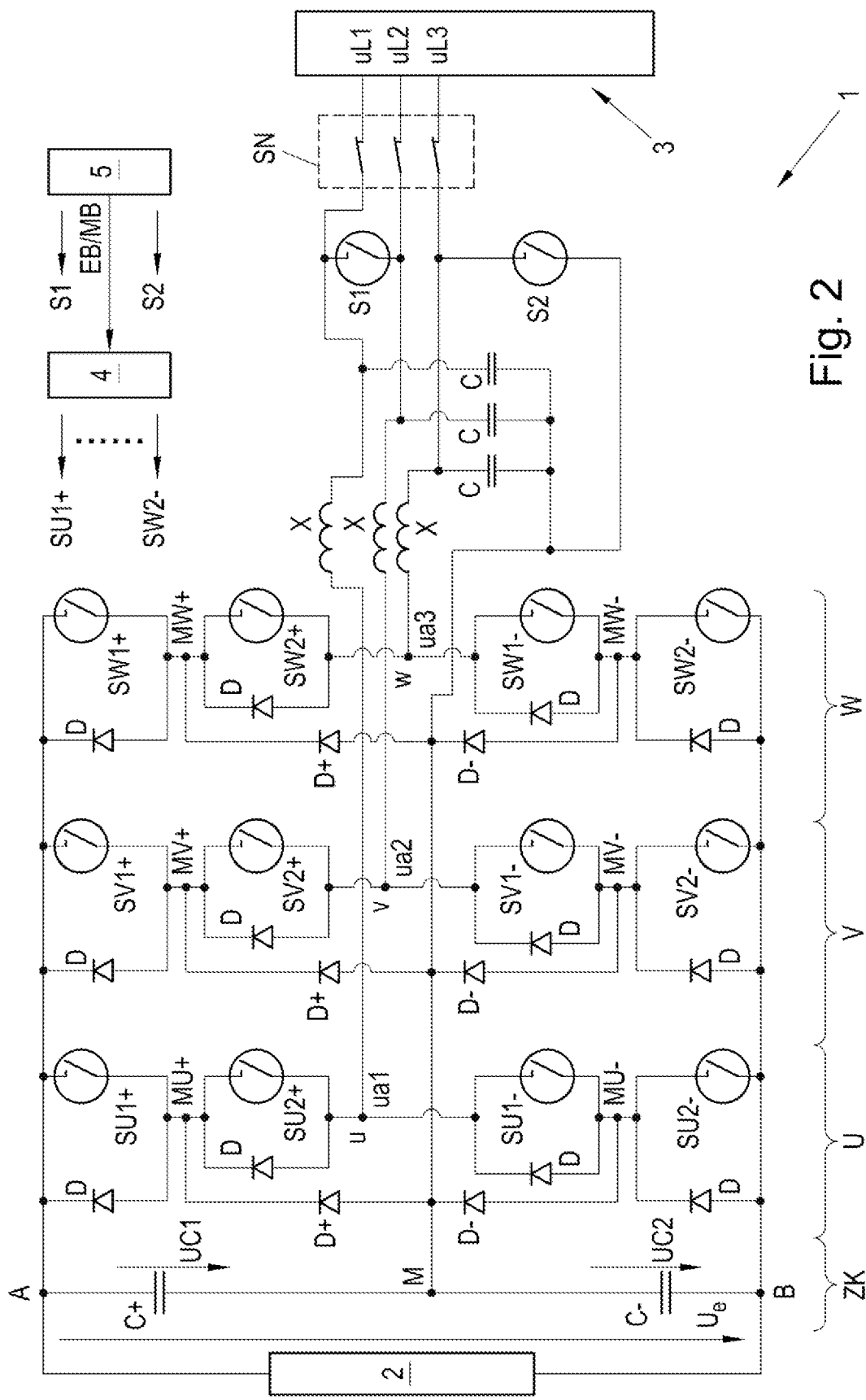
Figure 3:
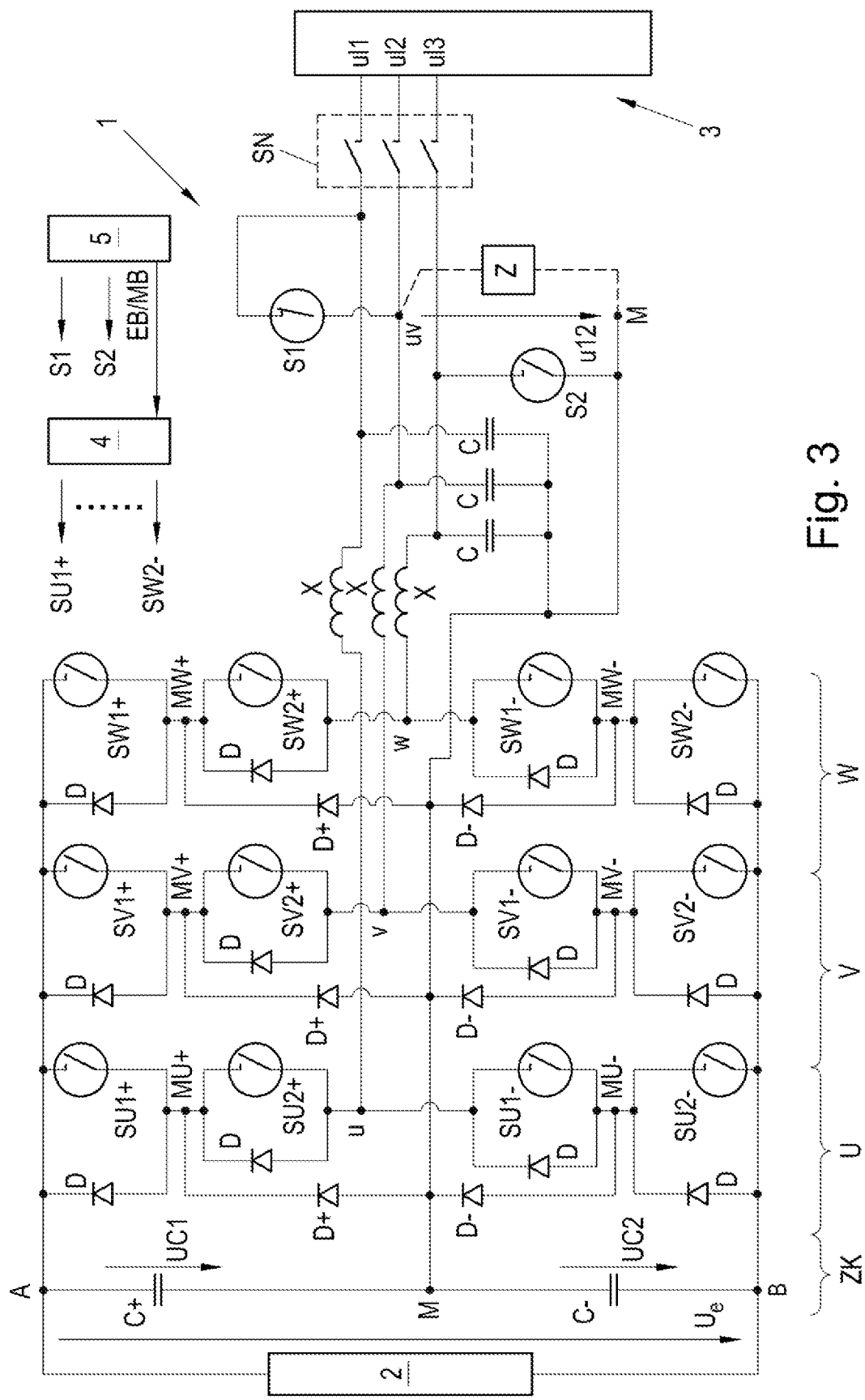
Figure 4:
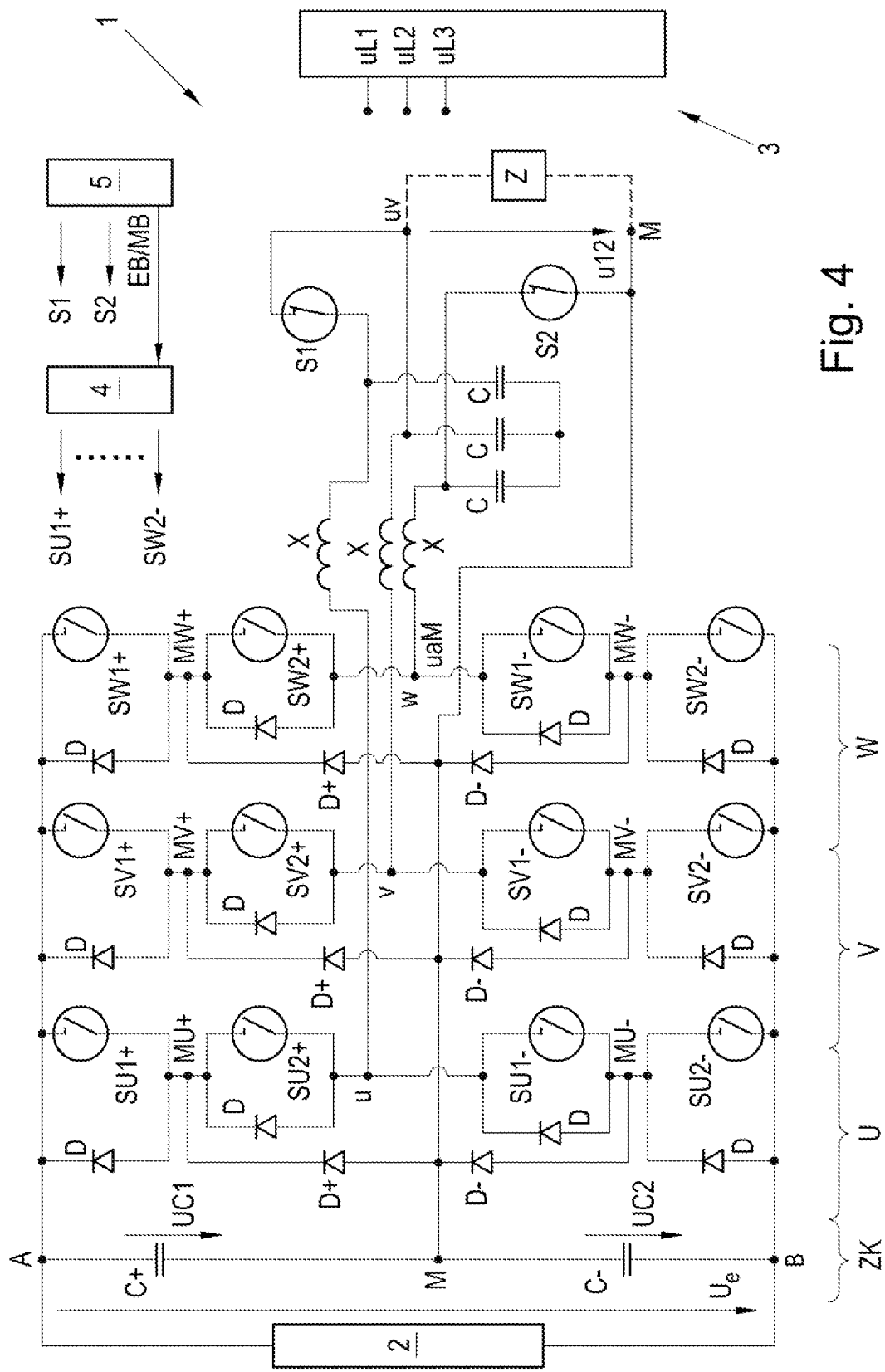
Figure 5B:
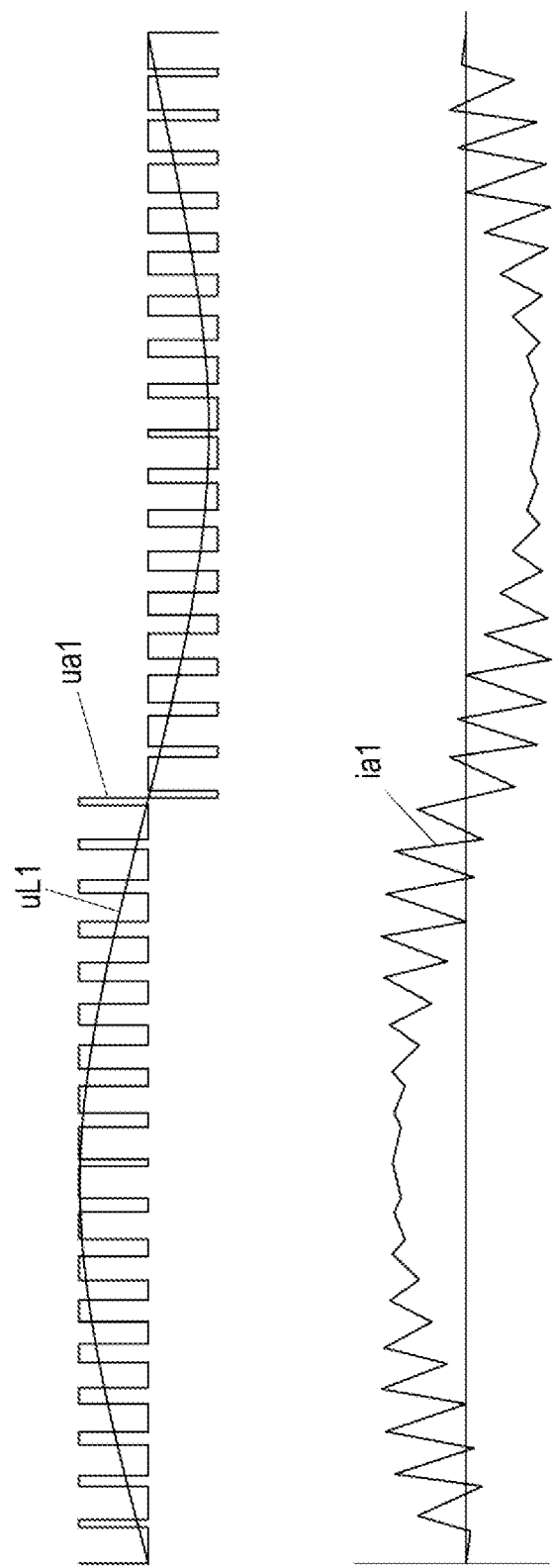
Figure 6:
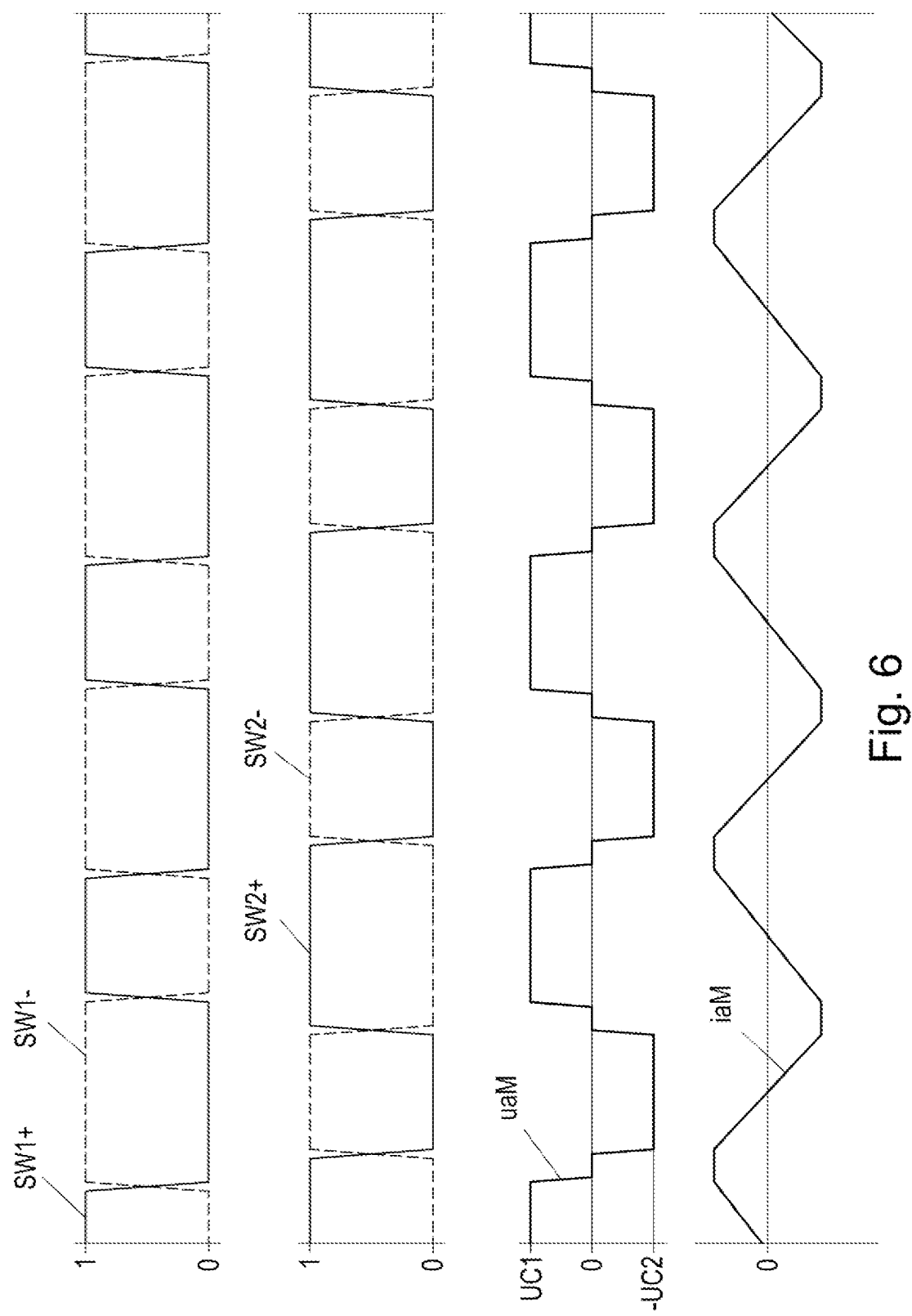
Figure 7:
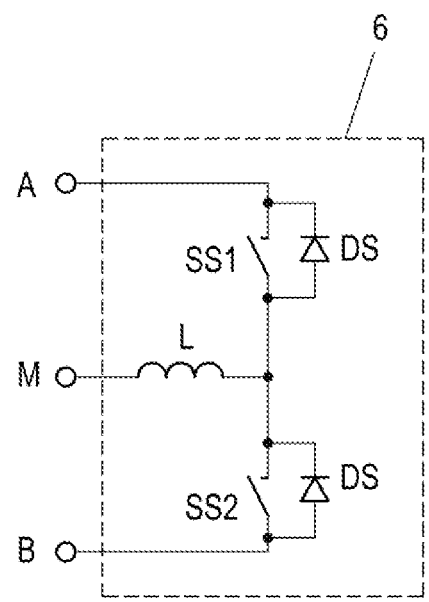

In the following, the present invention is described in greater detail with reference to FIGS. 1 through 7, which, by way of example, show schematic and non-limiting, advantageous embodiments of the invention. In the drawings:

FIG. 1 shows an inverter according to the prior art,

FIG. 2 shows an inverter with a phase connection switch and a center point connection switch in multi-phase operation, FIG. 3 shows the inverter from FIG. 2 in single-phase operation, FIG. 4 shows the inverter with a closed center point connection switch, FIG. 5a shows the switching pulses of the power switches in multi-phase operation, FIG. 5b shows the output voltage and the output current in multi-phase operation, FIG. 6 shows the switching pulses of the power switches of the third phase branch during symmetrizing in single-phase operation, as well as the output voltage and the output current, FIG. 7 shows a possible embodiment of the symmetrizing unit.

FIG. 1 shows a schematic inverter 1 according to the prior art, which has a DC voltage source 2, e.g., a photovoltaic system in generator mode, on its input side. The DC voltage source 2 thus provides the inverter 1 with an input DC voltage Ue. Furthermore, on the input side of the inverter 1, there is provided a capacitive DC link ZK, to which the input DC voltage Ue is applied. The DC link ZK comprises an upper DC link capacitor C+ and a lower DC link capacitor C− connected in series via a DC link center M, wherein, of course, further series and/or parallel capacitors can also be provided in the DC link ZK. The input DC voltage Ue is applied between a first input pole A and a second input pole B, wherein the series connection of the two DC link capacitors C+. C− is arranged between the first input pole A and the second input pole B. The input DC voltage Ue is thus divided on the two DC link capacitors C+ and C−, wherein the upper DC link voltage UC1 is applied to the upper DC link capacitor C+, and the lower DC link voltage UC2 is applied to the lower DC link capacitor C−.

The inverter comprises at least three, and preferably exactly three, phase branches U, V, W. Each phase branch U, V, W connects the first input pole A and the second input pole B via a first upper power switch SU1+, SV1+, SW1+ and a first lower power switch SU1−, SV1−, SW1− connected in series to the first upper power switch SU1+, SV1+, SW1+ via an output pole u, v, w. One output AC voltage ua1, ua2, ua3 per output pole u, v, w is, in multi-phase operation MB, output at each of the output poles u, v, w. Free-wheeling diodes D are arranged in parallel to the upper power switches SU1+, SV1+, SW1+ and the lower power switches SU1−, SV1−, SW1−, and are polarized in the direction of the first pole A.

In the exemplary embodiment shown, a second upper power switch SU2+, SV2+, SW2+ is connected in each of the phase branches U, V, W via an upper center point MU+, MV+, MW+ to the first upper power switch SU1+, SV1+, SW1+. Similarly, a second lower power switch SU2−, SV2−, SW2− is connected to the first lower power switch SU1+, SV1+, SW1+ via a lower center point MU−, MV−, MW−. Free-wheeling diodes D are arranged parallel to the second upper power switches SU2+, SV2+, SW2+ and the second lower power switches SU2−, SV2−, SW2−, and are polarized in the direction of the first pole A. Of course, further power switches can also be provided in the phase branches U, V, W—for example, in order to increase the power of the inverter 1. The DC link center point M is connected in the corresponding phase branch U, V, W via upper diodes D+ to each of the upper center point MU+, MV+, MW+ and is polarized in the direction of the upper center points MU+, MV+, MW+. The lower center points MU−, MV−, MW− are connected in the corresponding phase branch U, V, W in each case via lower diodes D− to the DC link center M, wherein the lower diodes D− are polarized in the direction of the DC link center point M. The illustrated inverter 1 thus represents, by way of example, a three-phase NPC (neutral point clamped) multi-level inverter with the phase branches U, V. W, wherein, here, each phase branch U, V, W comprises an upper half bridge (in each case with the associated first and second upper power switches SU1+ and SU2+, SV1+ and SV2+, SW1+ and SW2+) and a lower half bridge (in each case with the associated first and second lower power switches SU1− and SU2−, SV1− and SV2−, SW1− and SW2−). The upper and lower half bridges can be regarded together as a DC voltage/AC voltage bridge circuit.

The power switches SU1+, SV1+, SW1+, SU1−, SV1−, SW1−, SU2+, SV2+, SW2+, SU2−, SV2−, SW2− of the at least three phase branches U, V, W are controlled in multi-phase operation MB by a control unit 4 such that an output AC voltage ua1, ua2, ua3 is output at each output pole u, v, w, wherein the output AC voltages ua1, ua2, ua3 are preferably phase-shifted. Thus, the input DC voltage Ue is converted by the inverter 1 to one output AC voltage ua1, ua2, ua3 per phase branch U, V, W. The output AC voltages ua1, ua2, ua3 can be applied to the output of the inverter 1 in each case at the network phases of an energy supply network 3, whereby output alternating currents ia1, ia2, ia3 are fed into the energy supply network 3. This is indicated in FIG. 1 by the closed power switch SN. The energy supply network 3 comprises a number of network phases, each of which has a phase-shifted network voltage uL1, uL2, uL3 (for example, 230 volts) with a network frequency (for example, 50 Hz). The output AC voltages ua1, ua2, ua3 are preferably synchronized with the corresponding network voltage uL1, uL2, uL3 in order to allow them to be easily fed into the energy supply network 3. The output poles u, v, w are also optionally provided with serial filter coils X and parallel filter capacitors C. The filter capacitors C are here connected in star form, wherein the star point is connected to the DC link center point M. The mode of operation of a multi-phase inverter 1 in multi-phase operation MB is well known, and therefore it will not be discussed in greater detail at this juncture.

FIG. 2 shows a preferred embodiment of an inverter 1 according to the invention, wherein the first output pole u is connected to the second output pole v via a phase connection switch S1. Of course, the second output pole v can instead also be connected via the phase connection switch S1 to the third output pole w, or the first output pole u can be connected via the phase connection switch S1 to the third output pole w. Furthermore, a switching unit 5 is provided which is designed to close the phase connection switch S1 for switching to single-phase operation EB, and preferably also to open it for switching to multi-phase operation MB. The switching unit 5 is preferably an integral component of the control unit 4.

In multi-phase operation MB, the energy supply network 3 is connected to the output poles u, v, w, as is symbolized in FIG. 2 by the closed power switch SN. Furthermore, the phase connection switch S1 is opened, whereby the inverter 1 can be operated in a known manner in multi-phase operation MB.

If a switchover from multi-phase operation MB to single-phase operation EB is provided, the phase connection switch S1 can be closed by the switching unit 5, and the first and second output poles u, v can thus be connected to form a common output pole uv. However, it is also possible to use only the first or second output pole u, v in single-phase operation EB, wherein these output poles u, v are not connected to form a common output pole uv. This embodiment of the inverter 1 according to the invention is not shown in the figures.

In single-phase operation EB, the inverter 1 is preferably disconnected from the energy supply network 3, as is symbolized in FIG. 3 by the open power switch SN. Furthermore, a load Z between the common output pole uv and the DC link center point M is shown in FIG. 3. If only the first or second output pole u, v is used in single-phase operation EB, the load Z is thus provided between the first output pole u and the DC link center point M or the second output pole v and DC link center point M. In this case, the power switches SU1+, SV1+, SU1−, SV1− of the first or second phase branch U. V can continue to be controlled as in multi-phase operation MB in order, as in multi-phase operation MB, to output a (now only single-phase) output AC voltage ua1, ua2 between the first output pole u and the DC link center point M or the second output pole v and the DC link center point M, i.e., at the load Z. Thus, only one of the phase branches U, V is operated here for outputting the single-phase output AC voltage.

However, if a common output pole uv is provided, as shown in the figures, the switching unit 5 in single-phase operation EB effects a control of the power switches SU1+, SV1+, SU1−, SV1− of the first and second phase branches U, V for outputting a single-phase output voltage u12 between the common output pole uv and the DC link center point M, i.e., at the load Z. This effect of control of the power switches SU1+, SV1+, SU1−, SV1− of the first and second phase branches U. V for outputting a single-phase output voltage u12 can take place, for example, by the switching unit 5 itself assuming the control of the relevant power switches SU1+, SV1+, SU1−, SV1− or by the switching unit 5 instructing the control unit 4 to control the relevant power switches SU1+, SV1+, SU1−, SV1− correspondingly, as indicated in FIG. 3 by the connection arrow between the switching unit 5 and the control unit 4.

If a common output pole uv and a corresponding output voltage u12 are provided, the inverter 1 is preferably switched from single-phase operation EB to multi-phase operation MB by the phase connection switch S1 preferably being opened again by the switching unit 5, in order to disconnect the first output pole u and the second output pole v.

Furthermore, during switching from single-phase operation EB to multi-phase operation MB, the switching unit 5 can effect a control of the power switches SU1+, SV1+, SU1−, SV1− of the at least three phase branches U, V, W for outputting the at least three output AC voltages ua1, ua2, ua3 at the corresponding output pole u, v, w. This can be implemented by the switching unit 5 instructing the control unit 4 to control the relevant power switches SU1+, SV1+, SU1−, SV1− correspondingly, as indicated in FIG. 3 by the connecting arrow.

In order to symmetrize the DC link voltages UC1, UC2 at the first and second DC link capacitors C+, C− with irregular loads of the upper and lower half-waves of the single-phase output voltage u12, a symmetrizing unit 6 can also be provided (not shown in FIG. 3 for reasons of space). The symmetrizing unit 6 is connected to the first and second input poles A, B and to the DC link center point M. One possible embodiment of a symmetrizing unit 6 is shown in FIG. 7 and comprises an upper symmetrizing switch SS1 and a lower symmetrizing switch SS2, which are connected in series and connect the first and second input poles. The connection point between the upper symmetrizing switch SS1 and a lower symmetrizing switch SS2 is connected directly or via a symmetrizing choke L to the DC link center point M. The upper symmetrizing switch SS1 and the lower symmetrizing switch SS2 are controlled by a symmetrizing controller, which can be an integral component of the control unit 4, in such a way that the DC link voltages UC1, UC2 are symmetrized at the first and second DC link capacitors C+, C−.

However, according to the invention, a center point connection switch S2 is provided between the DC link center point M and an output pole, which is not connected via the phase connection switch S1 to a further output pole, i.e., here, the third output pole w, as is likewise shown in FIG. 3. The switching unit 5 is designed, when switching from multi-phase operation MB to single-phase operation EB, to close the center point connection switch S2, and preferably also to open the center point connection switch S2 during switching from single-phase operation EB to multi-phase operation MB. Thus, no additional symmetrizing unit 6 is required.

If no phase connection switch S1 is provided, in single-phase operation EB, as mentioned, one of the output poles (for example, the first output pole u) is used for outputting the single-phase output AC voltage ua1. Thus, one of the output poles which are not used for this purpose (i.e., for example, the second or third output pole v, w, when the first output pole u is used for the output of the single-phase output AC voltage ua1), when switching from multi-phase operation MB to single-phase operation EB, is connected via a center point connection switch S2 to the DC link center point M, and preferably also, when switching from single-phase operation EB to multi-phase operation MB, via the center point connection switch S2, is opened to disconnect said output pole (for example, first or second output pole v, w) from the DC link center point M again.

If, in single-phase operation EB, the third output pole w is connected to the DC link center point M, the switching unit 5 can thus effect a control of the power switches SW1+, SW1−, SW2+, SW2− of the third phase branch W for symmetrizing the DC link voltages UC1, UC2 at the first and second DC link capacitors C+, C−. This can take place in that the switching unit 5 instructs the control unit 4 to control the relevant power switches SW1+, SW1−, SW2+, SW2−, which serves to symmetrize the DC link voltages UC1. UC2 at the first and second DC link capacitors C+, C−.

Over a half-wave, the control unit 4 selects the duty cycle of the clocking switch pair in such a way that the desired output voltage u1 is output, and preferably follows the first network voltage uL1. FIG. 5a shows the control of the power switches of the first phase branch U in multi-phase operation MB. In the uppermost graph of FIG. 5a, the control of the first upper power switch SU1+ is shown, and, in the second graph of FIG. 5a, the control of the second power switch SU2+ is shown, wherein the control of the first lower power switch SU1− is shown in the graph below, and the control of the second lower power switch SU2− is shown in the lowermost graph. The first graph of FIG. 5b shows the first output voltage u1 at the first output pole u, and the second graph of FIG. 5b shows the output current ia1 output at the first output pole. For the upper half-wave of the output voltage u1 of the phase branch U, the control unit 4 switches the first upper power switch SU1+ (of the upper half-bridge) equally and oppositely to the first lower power switch SU1- (of the lower half-bridge) with a fixedly predetermined or variable clock frequency. During the upper half-wave here, the duty cycle of the first upper power switch SU1+ is changed from approximately 0% to approximately 100%, and again to approximately 0%, wherein the duty cycle of the first lower power switch SU1- is changed from approximately 100% to approximately 0%, and again to approximately 100%. During the upper half-wave, the second upper power switch SU2+ is closed, and the second lower power switch SU2- is opened.

For the lower half-wave, the first lower power switch SU2+ (of the upper half-bridge) switches oppositely to the second lower power switch SU2- (of the lower half bridge) with a fixedly predetermined or variable clock frequency. During the lower half-wave here, the duty cycle of the second upper power switch SU2+ is changed from approximately 100% to approximately 0%, and again to approximately 100%, wherein the duty cycle of the second lower power switch SU2- is changed from approximately 0% to approximately 100%, and again to approximately 0%. In this case, the first lower power switch SU1- (of the lower half-bridge) is closed during the lower half-wave, and the first upper power switch SU1+ (of the upper half-bridge) is opened.

The power switches SV1+, SV1-, SV2+, SV2-, SW1+, SW1-, SW2+, SW2- of the second and third phase branches V, W are controlled equally in multi-phase operation MB, wherein a 120° phase shift is usually provided between the various output voltages u1, u2, u3. Of course, the control of the power switches SU1+, SU1-, SU2+, SU2-, SV1+, SV1-, SV2+, SV2-, SW1+, SW1-, SW2+, SW2- of the various phase branches (apart from a phase shift) need not be implemented in an exact fashion. Particularly in the presence of an asymmetrical network voltage uL1, uL2, uL3, the control of the power switches SU1+, SU1-, SU2+, SU2-, SV1+, SV1-, SV2+, SV2-, SW1+, SW1-, SW2+, SW2- of the various phase branches by the control unit 4 can deviate slightly.

If an output pole, e.g., of the first or second output pole u, v, for outputting the single-phase output AC voltage is used only in single-phase operation EB, then the power switches of the associated phase branch (SU1+, SU1-, SU2+, SU2-, when the first output pole U is used, or SV1+, SV1-, SV2+, SV2-, when the second output pole V is used) are preferably controlled as in multi-phase operation MB.

If, in single-phase operation EB, the first and second output poles u, v are connected to form a common output pole uv, the power switches of the first and second phase branches SU1+, SU1-, SU2+, SU2-, SV1+, SV1-, SV2+, SV2- are likewise preferably controlled as in multi-phase operation MB. Preferably, however, no phase shift is provided. If a common output pole uv is provided, double the amount of power can be output to the load Z.

It is also conceivable that, in single-phase operation EB, the common output pole uv is likewise connected to the third output pole, and thus also the power switches of the third phase branch SW1+, SW1-, SW2+, SW2- are controlled fundamentally as in multi-phase operation MB (not shown). Preferably, no phase shift between the output AC voltages generated at the output poles u, v, w is then provided, whereby three times the power can be output to the load Z at a common, three-fold output pole uvw. If all phase branches U, V, W are used for the output of the single-phase output AC voltage, however, no phase branch for summa-rization remains free. Thus, summarization can take place on the basis of an external symmetrizing unit 6.

In single-phase operation EB, when using the first or second—but also when using a common output pole uv,— the situation may arise, as mentioned, that the DC link voltages UC1, UC2 at the DC link capacitors C+, C- do not match. In order to generate a symmetrizing current by the third output pole w, which counteracts this asymmetry, in single-phase operation EB, a symmetrizing unit 6 can be used, as explained above. If not all output poles u, v, w are connected to form a common output pole uvw, but at least one output pole remains free (here, the third output pole w remains free, since the first and second output poles u, v are connected to form a common output pole uv), in single-phase operation EB, the free output pole (here, the third output pole w) can be connected by the switching unit 5 via the center point connection switch S2 to the DC link center point M. Thus, summarization of the DC link voltages UC1. UC2 at the DC link capacitors C+, C- can be implemented via a suitable clocking of the power switches SW1+, SW1-, SW2+, SW2- of the third phase branch.

An exemplary pulse pattern of the power switches SW1+, SW2+, SW1-, SW2- of the third phase branch W for symmetrizing the DC link voltages UC1, UC2 is shown in FIG. 6. Thus, a symmetrizing voltage uaM is generated at the third output pole w, and, in the case of asymmetrical DC link voltages UC1, UC2, causes a symmetrizing current iaM, which acts against this asymmetry of the DC link voltages UC1, UC2 and compensates for this. In order to achieve this compensation, the first upper power switch SW1+ and the first lower power switch SW1- are clocked oppositely, and, moreover, the second upper power switch SW2+ and the second lower power switch SW2- are clocked oppositely.

The symmetrizing voltage uaM changes between a positive and negative phase, which are preferably of the same length. There is a positive phase of the symmetrizing voltage uaM if the first and second upper power switches SW1+, SW2+ are closed, and the first and second lower power switches SW1-, SW2- are open. In the positive phase, the symmetrizing voltage uaM corresponds to the upper DC link voltage UC1. There is a negative phase of the symmetrizing voltage uaM if the first and second lower power switches SW1-, SW2- are closed, and the first and second upper power switches SW1+, SW2+ are open. In the negative phase, the symmetrizing voltage uaM corresponds to the negative lower DC link voltage UC2.

If the DC link voltages UC1, UC2, and thus also the positive and negative phases of the symmetrizing voltage uaM, are symmetrical with respect to one another, the symmetrizing current iaM thus has a mean value of zero, as shown in FIG. 6. However, if the DC link voltages UC1, UC2, and thus also the positive and negative phases of the symmetrizing voltage uaM, are asymmetrical—for example, due to an asymmetrical load Z—the curve of the symmetrizing current iaM shifts in such a way that its average value is positive or negative depending upon the asymmetry of the DC link voltages UC1, UC2, whereby the DC link voltages UC1, UC2 are again symmetrized, i.e., compensated for, by the supplied symmetrizing current iaM. The symmetrizing current iaM thus causes a power flow from the DC link capacitor C+, C- of lower DC link voltage UC1, UC2 to the DC link capacitor C+, C- of higher DC link voltage UC1, UC2. During this compensation, the symmetrizing current iaM is again displaced in such a way that its average value becomes lower-until the DC link voltages UC1, UC2, and thus also the positive and negative phases of the symmetrizing voltage uaM, are again symmetrical, and the symmetrizing current iaM is thus zero.

Advantageously, no direct change from a positive phase of the symmetrizing voltage uaM to a negative phase of the symmetrizing voltage uaM takes place, and vice versa. It is thus possible to prevent the power switches SW1+, SW2+, SW1−, SW2− from being able to assume inadmissible switching states that might lead to damage of the inverter 1. This means that, during switching from the positive phase of the symmetrizing voltage uaM (at the level of the DC link voltage UC1) to the negative phase of the symmetrizing voltage uaM (at the level of the negative DC link voltage UC2), the symmetrizing voltage uaM remains, for a certain delay time, at zero (zero phase). Thus, the first and second upper power switches SW1+, SW2+ are first closed, and the first and second lower power switches SW1−, SW2− are opened (positive phase of the symmetrizing voltage uaM). Thereafter, the symmetrizing voltage uaM is kept to zero during the delay time (zero phase of the symmetrizing voltage uaM) by the second upper power switch SW2+ and the first lower power switch SW1− being closed, and the first upper power switch SW1+ and the second lower power switch SW1− being opened. Once the delay time has elapsed, the first and second lower power switches SW1−, SW2− are closed, and the first and second upper power switches SW1+, SW2+ are opened (negative phase of the symmetrizing voltage uaM). Similarly, the negative phase of the symmetrizing voltage uaM is switched via a zero phase to the positive phase of the symmetrizing voltage uaM, wherein the same delay time is, advantageously, provided for this zero phase as for the zero phase during switching from the positive phase to the negative phase. By suitably selected zero phases, a ripple current through the filter coil L of the third phase branch W can be reduced in the idle mode, i.e., when the DC link voltages UC1, UC2 are symmetrical.

In order to further prevent the occurrence of inadmissible switching states or transitions from switching states of the power switches SW1+, SW2+, SW1−, SW2− that could lead to damage of the inverter 1, starting from the zero phase (first lower power switch SW1− and second upper power switch SW2+ closed, second lower power switch SW2− and first upper power switch SW1+ open), during a transition to the positive phase (first and second upper power switches SW1+, SW2+ closed and the first and second lower power switches SW1−, SW2− open), only the first lower power switch SW1− can be opened, and the first upper power switch SW1+ can then be closed only after a dead time. Likewise, starting from the positive phase into the zero phase, the first upper power switch SW1+ can be opened first, and the first lower power switch SW1− can be closed only after a dead time.

Likewise, starting from the zero phase (first lower power switch SW1− and second upper power switch SW2+ closed, second lower power switch SW2− and first upper power switch SW1+ open), during a transition to the negative phase (first and second lower power switches SW1−, SW2− closed, and the first and second upper power switches SW1+, SW2+ open), the second upper power switch SW2+ can be opened first, and the second lower power switch SW2− can then be closed only after a dead time. Likewise, starting from the negative phase into the zero phase after the opening of the second lower power switch SW2−, the second upper power switch SW2+ can be closed again only after a dead time. For reasons of clarity, said dead times are not shown in FIG. 6.

The invention claimed is:

1. An inverter having a first input pole and a second input pole comprising:
   a first phase branch with a first upper power switch and a first lower power switch connected in series to the first upper power switch via a first output pole;
   a second phase branch, with a second upper power switch and a second lower power switch connected in series to the second upper power switch via a second output pole;
   a DC link arranged between the first input pole and the second input pole, with a first DC link capacitor and a second DC link capacitor connected via a DC link center point to the first DC link capacitor;
   a switching unit which is designed to switch the inverter from multi-phase operation to single-phase operation, in order to output a single-phase output AC voltage;
   a third phase branch, having a third upper power switch and a third lower power switch connected in series to the third upper power switch via a third output pole;
   a control unit which is designed, in a multi-phase operation, to control the first, second and third upper power switches and the first, second and third lower power switches of the first, second and third phase branches in such a way that an input DC voltage applied between the first input pole and the second input pole is converted into an output AC voltage applied to corresponding output poles,
   wherein a center point connection switch is provided between the third output pole and the DC link center point,
   wherein the switching unit is designed, in single-phase operation, to close the center point connection switch, in order to connect the third output pole to the DC link center point, and
   wherein the switching unit is designed, in single-phase operation, to effect a control of the third upper switch and the third lower power switch of the third phase branch for symmetrizing DC link voltages at the first and second DC link capacitors.

2. The inverter according to claim 1, wherein the switching unit is designed, in single-phase operation, to instruct the control unit to control the third upper switch and the third lower power switch of the third phase branch for symmetrizing the DC link voltages at the first and second DC link capacitors.

3. The inverter according to claim 1, wherein the switching unit is designed, during switching from single-phase operation to multi-phase operation, to effect a control of the first, second and third upper power switches and the first second and third lower power switches of the first, second and third phase branches for outputting the output AC voltages at the corresponding output poles.

4. The inverter according to claim 1, wherein, in the first phase branch, a further first upper power switch is connected via a first upper center point to the first upper power switch of the first phase branch, and a further first lower power switch is connected via a first lower center point to the first lower power switch of the first phase branch,
   wherein, in the second phase branch, a further second upper power switch is connected to the second upper power switch of the second phase branch via a second upper center point, and a further second lower power switch is connected via a second lower center point to the second lower power switch of the second phase branch, wherein, in the third phase branch, a further third upper power switch is connected via a third upper center point to the third upper power switch of the third phase branch, and a further third lower power switch is connected via a third lower center point to the third lower power switch of the third phase branch, and wherein, in the first, second, and third phase branches, the first, second, and third upper center points and the first, second, and third lower center points are connected to the DC link center point.

5. The inverter according to claim 1, wherein the switching unit is designed, in single-phase operation, to close a phase connection switch arranged between the first and second output poles in order to connect the first and second output poles to form a common output pole and to effect a control of the first and second upper power switches and the first and second lower power switches of the first and second phase branches to output a single-phase output AC voltage between the common output pole and the DC link center point.

6. The inverter according to claim 5, wherein the switching unit is designed, in single-phase operation, to instruct the control unit to control the first and second upper power switches and the first and second lower power switches of the first and second phase branches for outputting the single-phase output AC voltage at the common output pole.

7. The inverter according to claim 5, wherein the switching unit is designed to open a phase connection switch during the switching from single-phase operation to multi-phase operation, in order to disconnect the first output pole and the second output pole.

8. A method for operating an inverter that includes a first phase branch, having first upper power switch and a first lower power switch connected in series thereto via a first output pole, a second phase branch, having a second upper power switch and a second lower power switch connected in series thereto via a second output pole, a third phase branch, having a third upper power switch and a third lower power switch connected in series thereto via a third output pole, the method comprising:

in multi-phase operation, controlling the first, second and third upper power switches and the first, second and third lower power switches of each of the phase branches in such a way that an input DC voltage is converted into output AC voltages applied to an output pole, applying the input DC voltage to a DC link having a first DC link capacitor and a second DC link capacitor connected via a DC link center point, switching, via a switching unit, the inverter from a multi-phase operation to single-phase operation in order to output a single-phase output AC voltage, wherein the third output pole is connected to the DC link center point, and controlling the third upper switch and the third lower power switch of the third phase branch for symmetrizing DC link voltages at the first and second DC link capacitors.

9. The method according to claim 8, wherein, in single-phase operation, the first and second output poles are connected to a common output pole, and wherein the single-phase output AC voltage is output between the first and/or second output pole and the DC link center point.

10. The method according to claim 9, the first and second upper power switches and the first and second lower power switches of the first and second phase branch are actuated, in single-phase operation, by the switching unit in such a way that the single-phase output AC voltage is output at the common output pole.

11. The method according to claim 9, the switching unit, in single-phase operation, instructs the control unit to control the first and second upper power switches and the first and second lower power switches of the first and second phase branch in such a way that the single-phase output AC voltage is output at the common output pole.

12. The method according to claim 9, during switching from single-phase operation to multi-phase operation of the inverter, the first output pole and the second output pole are disconnected.

13. The method according to claim 12, wherein, during the switching from single-phase operation to multi-phase operation of the inverter, the switching unit disconnects the first output pole and the second output pole.

* * * * *